United States Patent
Venkatesh

(10) Patent No.: US 10,353,872 B2
(45) Date of Patent: Jul. 16, 2019

(54) METHOD AND APPARATUS FOR CONVERSION OF VIRTUAL MACHINE FORMATS UTILIZING DEDUPLICATION METADATA

(71) Applicant: Atlantis Computing, Inc., Sunnyvale, CA (US)

(72) Inventor: Chetan Venkatesh, Belmont, CA (US)

(73) Assignee: HIVEIO INC., Hoboken, NJ (US)

( * ) Notice: Subject to any disclaimer, the term of this patent is extended or adjusted under 35 U.S.C. 154(b) by 164 days.

(21) Appl. No.: 15/453,710

(22) Filed: Mar. 8, 2017

(65) Prior Publication Data

US 2017/0262307 A1 Sep. 14, 2017

Related U.S. Application Data

(60) Provisional application No. 62/305,839, filed on Mar. 9, 2016.

(51) Int. Cl.
*G06F 9/46* (2006.01)
*G06F 16/178* (2019.01)
*G06F 16/174* (2019.01)
*G06F 9/455* (2018.01)

(52) U.S. Cl.
CPC ...... *G06F 16/1794* (2019.01); *G06F 9/45533* (2013.01); *G06F 16/1748* (2019.01); *G06F 2009/45562* (2013.01)

(58) Field of Classification Search
CPC .......... G06F 9/45558; G06F 17/30156; G06F 17/30179; G06F 2009/45562
See application file for complete search history.

(56) References Cited

U.S. PATENT DOCUMENTS

| | | | |
|---|---|---|---|
| 8,996,800 B2 | 3/2015 | Venkatesh et al. | |
| 9,250,946 B2 | 2/2016 | Shravan et al. | |
| 9,471,590 B2 | 9/2016 | Venkatesh et al. | |
| 2011/0093471 A1* | 4/2011 | Brockway | G06F 17/30616 707/747 |
| 2011/0153697 A1* | 6/2011 | Nickolov | G06F 9/4856 707/827 |
| 2015/0227543 A1* | 8/2015 | Venkatesh | G06F 9/45533 707/620 |

* cited by examiner

*Primary Examiner* — Camquy Truong
(74) *Attorney, Agent, or Firm* — Womble Bond Dickinson (US) LLP

(57) ABSTRACT

A method and apparatus is disclosed herein for converting a virtual machine from an initial hypervisor format to a target hypervisor format utilizing deduplication metadata. The method may include generating a copy of a virtual machine by replication of deduplication metadata for one or more files corresponding to the virtual machine. Furthermore, the method may include opening the copy of the virtual machine from the replicated deduplication metadata. The method may also include converting the replicated deduplication metadata from an initial hypervisor format to a target hypervisor format to generate a converted virtual machine.

17 Claims, 6 Drawing Sheets

METHOD AND APPARATUS FOR CONVERSION OF VIRTUAL MACHINE FORMATS UTILIZING DEDUPLICATION METADATA

RELATED CASES

The present application claims the benefit of and priority to U.S. Provisional Application Ser. No. 62/305,839, filed Mar. 9, 2016, and incorporates that application in its entirety.

TECHNICAL FIELD

Embodiments of the invention relate to the field of data storage, and more particularly, to the conversion of a virtual machine to a target hypervisor format.

BACKGROUND

Virtual machine hypervisors, or virtual machine monitors, are responsible for creating and running virtual machines on a host machine. The virtual machine hypervisor provides a simulated computing environment on the host machine, through which the virtual machine can interact with the host machine's resources, such as network access, peripheral device access, disk storage, computing resources, etc. To ensure proper interaction with the operating platform of the virtual machine hypervisor, and thus the resources of the host machine, virtual machines are specifically configured for the proprietary formats of different hypervisor types. That is, a virtual machine that is compatible with one type of hypervisor may be partially or fully incompatible with another type of hypervisor. Therefore, deployment of a virtual machine between different hypervisor formats and/or host machines becomes highly problematic.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus is disclosed herein for converting a virtual machine from an initial hypervisor format to a target hypervisor format utilizing deduplication metadata. In one embodiment, the virtual machine is executed in a deduplication based file system, which maintains deduplication metadata for the virtual machine. Therefore, in order to perform a conversion between hypervisor formats, embodiments discussed herein generate a copy of the deduplication metadata for the virtual machine. The copy of the deduplication metadata may then be utilized to open (i.e., mount and execute) the copy of the virtual machine. In one embodiment, the deduplication metadata for the virtual machine is then converted from an initial hypervisor format to a target hypervisor format. After the conversion, the deduplication metadata may be utilized for execution of the virtual machine by a deduplication systems the provides support for the target hypervisor type.

As discussed herein, deduplication metadata for the virtual machine's contents, such as VM image files, configuration files, and additional data files, is converted to be compatible with the target hypervisor format. That is, by conversion of the deduplication metadata (e.g., reference pointers to data within a system cache or primary storage), the underlying virtual machine's format is converted. In one embodiment, such a conversion process can involve rewriting deduplication metadata contents, reorganizing the deduplication metadata contents, adding or removing deduplication metadata contents as required by a target hypervisor's formatting requirements, etc. Furthermore, because both the copying of the virtual and the conversion of the virtual machine are performed on the virtual machine's deduplication metadata, the time and processing resources required to perform the conversion are greatly reduced, enabling real-time or near real-time virtual machine format conversion.

Figure 1:
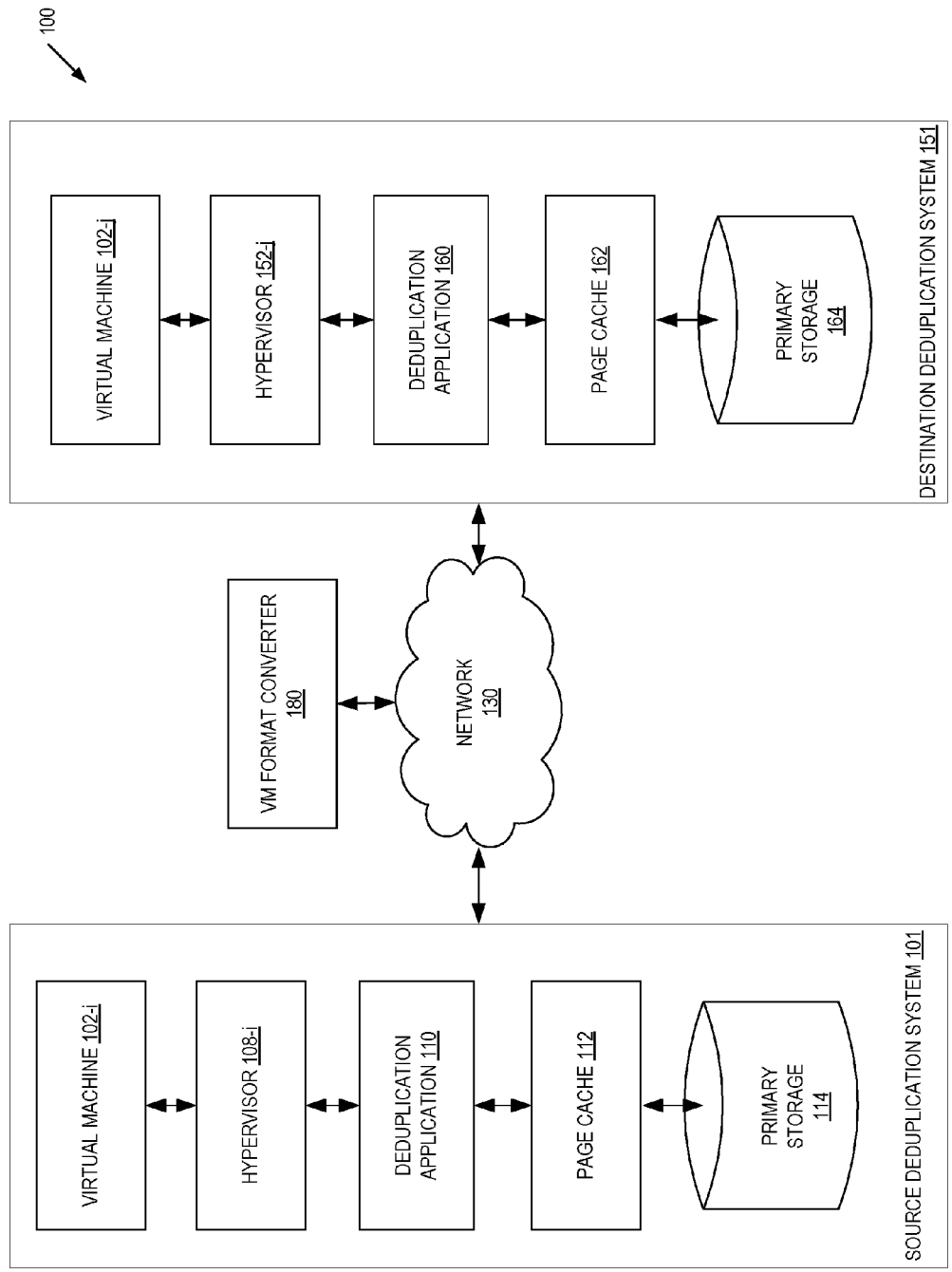
FIG. 1 is a block diagram of exemplary system architecture for enabling conversion of a hypervisor format of a virtual machine.

FIG. 1 is a block diagram of exemplary system architecture 100 for enabling conversion of a hypervisor format of a virtual machine. In one embodiment, the system 100 includes a source deduplication system 101, a destination deduplication system 151, and virtual machine (hereafter "VM") format converter 180. In the embodiments discussed herein, each deduplication system provides a virtualized computing environment. Although two deduplication systems are illustrated, any number of deduplication-based computing environments may be utilized in accordance with the discussion herein. Furthermore, a single deduplication system, such as source deduplication system 101, can be both the source and target deduplication system in in accordance with the discussion herein. The designation of the virtualized computing environments as "source" and "destination" is for illustrative purposes only, as a VM's format can be converted and then transferred to or from either system, between multiple systems, or within a single system.

The source deduplication system 101 and the destination deduplication system 151 may be coupled to a network 130. In one embodiment, the source deduplication system 101 and destination deduplication system 151 are communicatively coupled to the network 130 to enable communication between, for example, deduplication systems and VM format converter 180. Although VM format converter 180 is illustrated as communicatively coupled with systems 101 and 151 via network 130, one or both of deduplication systems 101 and 151 may include a local VM format converter. In one embodiment, network 130 enables communication between deduplication systems 101, deduplication system 151, and VM format converter 180 using any of the standard protocols for the exchange of information. In one embodiment, one or more of the source deduplication system 101, the destination deduplication system 151, and the VM format converter 180 are coupled to network 130 via a wireless or wired connection.

The source deduplication system 101, the destination deduplication system 151, and the VM format converter 180 may run on one Local Area Network (LAN), may be incorporated into the same physical or logical system, or may be different physical or logical systems. Alternatively, the source deduplication system 101, the destination deduplication system 151, and the VM format converter 180 may reside on different LANs, wide area networks, etc. that may be coupled together via a public network such as the Internet, separated by firewalls, routers, and/or other network devices. In yet another configuration, the source deduplication system 101, the destination deduplication system 151, and the VM format converter 180 may reside on the same server, or different servers, coupled to other devices via a public network (e.g., the Internet) or a private network (e.g., a LAN). It should be noted that various other network configurations can be used including, for example, hosted configurations, distributed configurations, centralized configurations, etc.

In one embodiment, the virtualized computing environment of source deduplication system 101 includes a VM 102-$i$, hypervisor 108-$i$, deduplication application 110, page cache 112, and primary storage 114. In one embodiment, destination deduplication system 151 includes hypervisor 152-$j$, deduplication application 160, page cache 162, and primary storage 164. In one embodiment, destination deduplication system 151 also includes VM 1021, which is a version of VM 102-$i$ that has been converted to the format of hypervisor 152-$j$ in accordance with the discussion herein. The number, type, configuration, topology, connections, or other aspects of source deduplication system 101, destination deduplication system 151, and VM format converter 180 may be varied and are not limited to the examples shown and described.

In reference to source deduplication system 101, VM 102-$i$ may be an instance of an operating system running on various types of hardware, software, circuitry, or a combination thereof (e.g., x86 servers) that are managed by hypervisor 108-$i$. As shown, deduplication application 110 may be used to deduplicate data to be written to primary storage 114 using page cache 112 as a memory into which data may be read or written before being asynchronously (or, in some embodiments, synchronously) written back to primary storage 114.

In one embodiment, deduplication applications 110 and 160 remove duplicate information in VM files in a read or write path of the virtualized computing environments (i.e., Virtual Desktop Infrastructure ("VDI")/Hosted Virtual Desktop ("HVD")) of the source and destination deduplication systems 101 and 151. Duplicate information is any block information that is already stored in primary storage 114, from a prior copy of the same data or from a different data set.

In some embodiments, a virtualized computing environment may be composed of a plurality of VMs, such as virtual machine 101-$i$ and 1021, running desktop operating systems (e.g., Windows XP or Windows 7 Enterprise by MICROSOFT CORPORATION® of Redmond, Wash.) on a virtualized hardware layer (such as those provided by companies such as VMWARE®, CITRIX®, MICROSOFT®, REDHAT®, or other makes of operating systems). A virtualized software layer (e.g., hypervisors 108-$i$ or 152-$j$) provides memory, disk (e.g., storage), and processing (i.e., CPU) resources to the VMs. The plurality of VMs, in one embodiment, access storage through deduplication applications 110, 160.

In one embodiment, deduplication applications 110 and 160 are configured to identify and remove duplicate information, replacing the duplicate information with pointers to a single copy of data, while a write operation from one or more of the VMs is still "in-flight" (i.e., sent to, but not written to permanent storage or disk (hereafter referred to as "primary storage")). In one embodiment, the deduplication uses a Random Access Memory ("RAM") of a deduplication application 110 or 160. In one embodiment, deduplication applications 110 and 160 may be configured to perform operations (e.g., read, write, copy on write, and others) on blocks of fixed lengths, such as 4 kilobyte blocks. In one embodiment, the deduplication applications 110, 160 process data "inline," i.e., in the data path or connection between a VM and primary storage, in real time or substantially real-time. In one embodiment, deduplication applications 110 and 160 may be configured to provide an inline and real-time or substantially real-time deduplication of data as the data is in-flight from one or more of VMs 102-$i$ and 102-$j$ to primary storage system (e.g., primary storage 114 or primary storage 164).

A primary storage system may be implemented using a computer hard disk based on rotational spindle, a computer hard disk based on Solid State Technologies, a redundant array of independent disks (hereafter "RAID") storage system that aggregates multiple computer hard disks, a storage area network (hereafter "SAN"), network attached storage (hereafter "NAS") that aggregates multiple RAID storage systems, among others.

In one embodiment, deduplication applications 110 and 160 are configured to eliminate duplicate copies of data to effect a form of data compression to maximize storage capacity of primary storages 114 and 164, and minimize time to storage. In a deduplication-based file system, such as those implemented by source deduplication system 101 and destination deduplication system 151, deduplication applications 110 and 160 identify duplicate copies of data, and implement reference links to point to the original data rather than storing another, redundant copy. As a result, duplicate data is not stored in storage, according to embodiments discussed herein. For example, deduplication applications 110 and 160 can store a reference link to the original data, instead of storing the duplicate data, in the form of deduplication metadata, which functions to describe the relationship between the original data and the deduplicated data. Examples of techniques used in deduplication of virtual machine files are described in U.S. Pat. No. 8,996,800, issued Mar. 31, 2015, entitled "DEDUPLICATION OF VIRTUAL MACHINE FILES IN A VIRTUALIZED DESKTOP ENVIRONMENT," which is incorporated herein in its entirety.

In embodiments discussed herein, deduplication applications 110 and 160 store deduplication metadata in a metadata file, metadata table, metadata database, or other format, in order to describe or map the relationships between the deduplicated data and the original data. In one embodiment, the deduplication metadata is organized to reflect individual files, as well as entire deduplicated file systems that are stored on primary storage 114 and/or 164. For example, a metadata file, table, or database can store data representing a block number that is associated with the physical location or data block of data in a storage device in a deduplicated file system. The metadata representing a block of a file or file system can contain data representing information such as a block number, data associated with a unique identifier that uniquely identifies the data in the file or file system, a reference link that associates the block of deduplication metadata to a physical location where the corresponding data block for the file can be located. In one embodiment, the unique identifier is a hash value generated by a hashing function, such as a SHA-1, MD5, etc.

In one embodiment, deduplication metadata created for one or more files or file systems by deduplication applications 110 and 160, is utilized to replicate data between deduplication systems 101 and 151. In one embodiment, the data replicated between systems 101 and 151 may be an individual file (e.g., a VM file), a VM image (e.g., a collection of files that form the VM), an entire file system, etc. The data replicated from source deduplication system 101 is rapidly replicated to destination deduplication system 151 in real-time or near real-time utilizing deduplication metadata. This avoids the needless transfer of repetitive data, as well as data that may already be stored by the destination deduplication system 151. VM files or VM images may consist of a high degree of repeated data. Therefore, the deduplication metadata based replication techniques enable significant replication performance gains over conventional replication techniques by avoiding having to transfer every block of a file, VM image, file system, etc. from source deduplication system 101 to destination deduplication system 151. Examples of techniques for the rapid replication and transfer of a VM file, image, or file system utilizing deduplication metadata are described in U.S. Pat. No. 9,250,946, issued Feb. 2, 2016, entitled "EFFICIENT PROVISIONING OF CLONED VIRTUAL MACHINE IMAGES USING DEDUPLICATION METADATA," U.S. Pat. No. 9,471,590, issued Oct. 18, 2016, entitled "METHOD AND APPARATUS FOR REPLICATING VIRTUAL MACHINE IMAGES USING DEDUPLICATION METADATA," and U.S. patent application Ser. No. 14/177,899, filed Feb. 11, 2014, entitled "METHOD AND APPARATUS FOR REPLICATION OF FILES AND FILE SYSTEMS USING A DEDUPLICATION KEY SPACE," which are incorporated herein in their entirety.

In one embodiment, as discussed in greater detail below, VM format converter 180 enables the conversion a VM 102-$i$ having an initial hypervisor format, such as a hypervisor format supported by hypervisor 108-$i$, to a target hypervisor format, such as the hypervisor format supported by hypervisor 152-$j$. For example, VM 102-$i$ may be formatted for hypervisor 108-$i$ that provides a VMWARE® virtualized environment, and converted to VM 102-$j$ which is formatted for hyper 152-$j$ that provides a CITRIX® virtualized environment. In the embodiments discussed herein, VM format converter 180 replicates VM 102-$i$ utilizing deduplication metadata according to the techniques discussed above. In the embodiments for converting a VM between hypervisor formats, the VM format converter 180 may copy deduplication metadata for VM 102-$i$ from source deduplication system 101 to destination deduplication system 151, and perform the conversion of VM 102-$i$ to VM 1021 at the destination deduplication system 151. In another embodiment, VM format converter 180 copies deduplication metadata for VM 102-$i$ on the source deduplication system 101, performs the conversion from VM 102-$i$ to VM 1021 on source deduplication system, and then transfers deduplication metadata for converted VM 102-$j$ to destination deduplication system 151 utilizing one of the fast deduplication data based replication or transfer techniques discussed above. In yet another embodiment, deduplication metadata for VM 102-$i$ may be replicated from source deduplication system 101 to VM format converter 180, converted to a target hypervisor format within VM format converter 180, and then the deduplication metadata for converted VM 1021 replicated to the destination deduplication system 151. In each of these embodiments, VMs may be rapidly copied and transferred between deduplication systems (e.g., systems 101 and 151) and the VM format converter 180 using deduplication metadata. Furthermore, the VMs may also be rapidly converted between formats utilizing the copied deduplication metadata.

Figure 2:
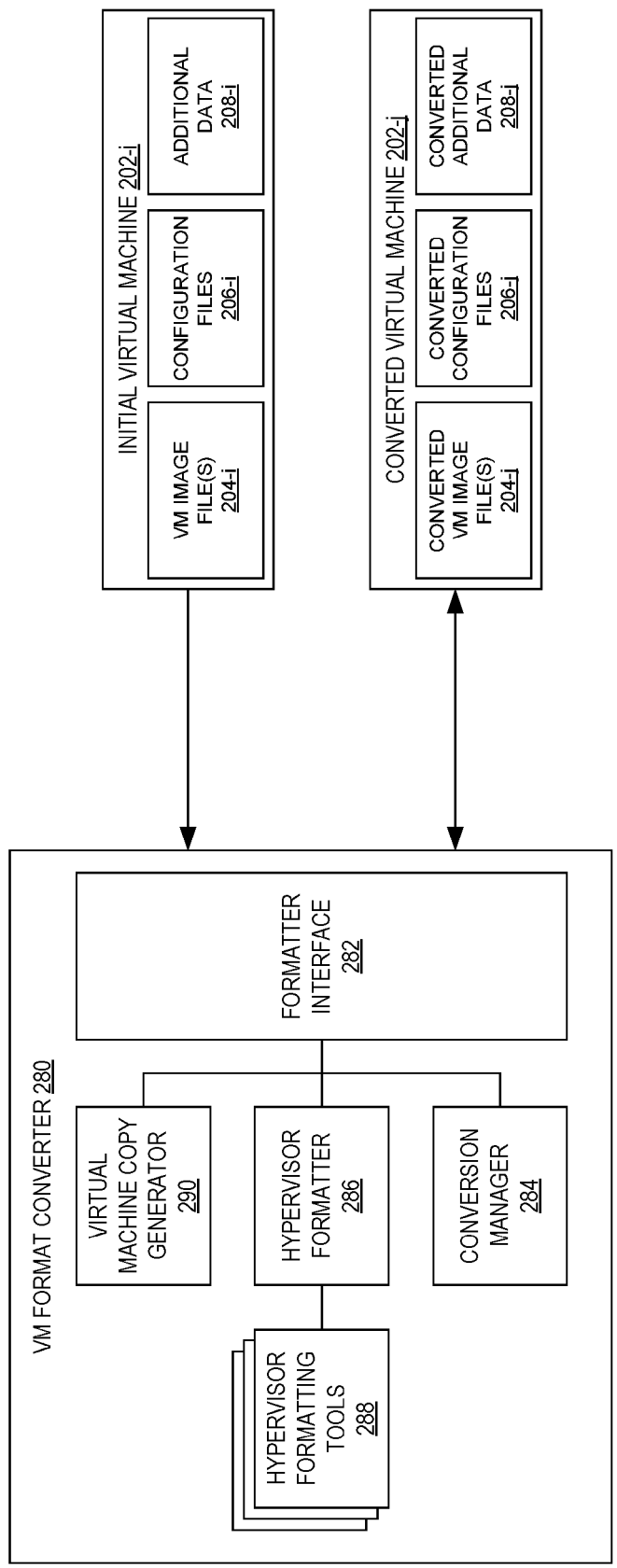
FIG. 2 is a block diagram of one embodiment of a virtual machine format converter.

FIG. 2 is a block diagram of one embodiment of a VM format converter 280. VM format converter 280 performs a rapid conversion of initial virtual machine 202-$i$ formatted for an initial hypervisor format to converted virtual machine 202-$j$ formatted for a target hypervisor format. In one embodiment, VM format converter 280 provides additional details for the VM format converter discussed above in FIG. 1. Furthermore, reference to VMs 202-$i$ and VM 202-$j$ as a "source," "initial," "destination," or "target," are merely for illustrative purposes. As discussed above, the replication and conversion of a VM by VM format converter 280 may occur between remote deduplication systems, between local deduplication systems, within a single deduplication system, or at VM format converter 280.

In one embodiment, VM format converter 280 includes a number of processing modules, which may be implemented as hardware, software, firmware, or a combination, such as formatter interface 282, conversion manager 284, hypervisor formatter 286, virtual machine copy generator 290. Furthermore, VM format converter 280 may store, or access, one or more hypervisor formatting tools 288.

In one embodiment, the conversion of a virtual machine from an initial format to a target format begins in response to formatter interface 282 receiving a conversion request from a deduplication system (e.g., source deduplication system 101 or destination deduplication system 151 of FIG. 1). In another embodiment, the conversion begins in response to one or more conditions monitored by conversion manager 284. For example, conversion manager 284 may trigger the conversion of a VM from an initial format to a target format on a periodic basis, based on resource usage thresholds at a deduplication system, based on pending transfer of a virtual machine, based on VM high availability thresholds, based on the occurrence of one or more failure conditions, based on a predicted future failure, etc. Furthermore, the conversion request may involve a request for multiple conversions. For example, initial VM 202-$i$ may be subject to conversion to a plurality of different formats. As another example, initial VM 202-$i$ may be subject to a plurality of conversions to the same format. Any number, type and combination of conversions can be performed in accordance with the discussion herein.

In response to the initiation of a VM format version, conversion manager 284 notifies the virtual machine copy generator 290 to perform a rapid replication of deduplication metadata for initial VM 202-$i$. In one embodiment, deduplication metadata for VM 202-$i$ includes VM image file(s) 204-$i$, configuration file(s) 206-$i$, and additional data 208-$i$. Each of these files may reside together within virtual machine 202-$i$, or may be maintained in different locations at a deduplication file system while referencing or otherwise being associated with virtual machine 202-$i$. In one embodiment, VM image file(s) 204-$i$ include operating system disk files, the configuration file(s) 206-$i$ include hypervisor configuration information for VM 202-$i$ that enable a hypervisor of the corresponding format to properly configure, register, and operate VM 202-$i$, and the additional data 208-$i$ includes files representing additional data that may be a part of VM 202-$i$. Virtual machine copy generator 290 reads deduplication metadata for the files of initial virtual machine 202-$i$ and performs a rapid deduplication metadata based replication of VM 202-$i$ files utilizing one or more of the techniques discussed in U.S. Pat. No. 9,250,946, issued Feb. 2, 2016, entitled "EFFICIENT PROVISIONING OF CLONED VIRTUAL MACHINE IMAGES USING DEDUPLICATION METADATA," U.S. Pat. No. 9,471,590, issued Oct. 18, 2016, entitled "METHOD AND APPARATUS FOR REPLICATING VIRTUAL MACHINE IMAGES USING DEDUPLICATION METADATA," and U.S. patent application Ser. No. 14/177,899, filed Feb. 11, 2014, entitled "METHOD AND APPARATUS FOR REPLICATION OF FILES AND FILE SYSTEMS USING A DEDUPLICATION KEY SPACE," which are incorporated herein in their entirety. In one embodiment, VM format converter 280 does not include the virtual machine copy generator 290, but instead requests that a copy generator available at a source or destination deduplication system, such as systems 101 and 151, generates the copy of initial VM 202-$i$.

Virtual machine copy generator 290 generates deduplication metadata for converted virtual machine 202-$j$. At this point in time, however, the converted VM image file(s) 204-$j$, converted configuration file(s) 206-$j$, and converted additional data 208-$j$ are copies of the corresponding files from initial VM 202-$i$. In order to complete the conversion process, hypervisor formatter 286 accesses the deduplication metadata for copied VM files of converted VM 202-$j$ and applies one or more hypervisor formatting tools 288 to the deduplication metadata. In one embodiment, each of hypervisor formatting tools 288 corresponds to different source and/or target hypervisor format combinations. That is, each hypervisor formatting tool provides conversion instructions, such as the steps needed to change the file content organization, target file naming conventions, target file structures, etc. in the deduplication metadata, for obtaining a fully converted VM 202-$j$ from the replicated contents of initial VM 202-$i$. After application of the hypervisor formatting tools 288 to deduplication metadata for converted VM 202-$j$, converted VM 202-$j$ may be deployed on a deduplication system with the corresponding hypervisor type.

Figure 3:
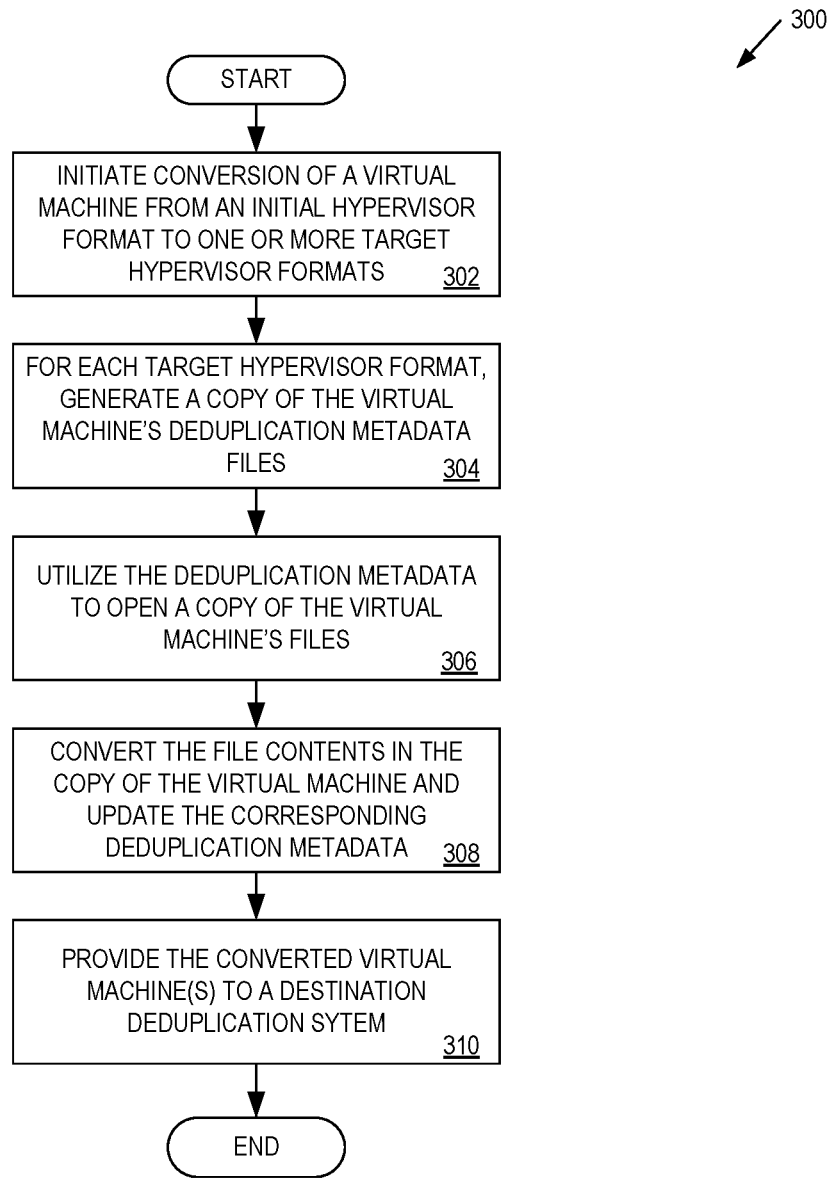
FIG. 3 is a flow diagram of one embodiment of a method for converting a virtual machine from a source hypervisor formatted virtual machine to a target hypervisor formatted virtual machine using deduplication metadata.

FIG. 3 is a flow diagram of one embodiment of a method 300 for converting a virtual machine from a source hypervisor formatted virtual machine to a target hypervisor formatted virtual machine using deduplication metadata. The method 300 is performed by processing logic that may comprise hardware (circuitry, dedicated logic, etc.), software (run on a general purpose computer system or a dedicated machine), firmware, or a combination. In one embodiment, the method 300 is performed by VM format converter, such as VM format converter 180 and 280, described above with respect to FIG. 1 and FIG. 2.

Referring to FIG. 3, the process begins by initiating conversion of a virtual machine from an initial hypervisor format to one or more target hypervisor formats (processing block 302). As discussed herein, the virtual machine operates within a deduplication storage system, such as the systems described an illustrated in FIG. 1, which maintains deduplication metadata for the virtual machine. In one embodiment, the initiation of a conversion of the format of the virtual machine may be initiated in response to a user command to perform one or more specific format conversions. In another embodiment, the initiation of the format of the virtual machine may be automatically initiated based on one or more configurable parameters, such as at regular time interval, in response to a threshold related to usage of specific amounts of storage space, in response to usage conditions of a host machine upon which the virtual machine is being run, lack of suitability of a target hypervisor type for a specific task to be completed by a virtual machine, to ensure one or more VM high availability requirements, etc.

Processing logic then generates, for each target hypervisor format, a copy of the virtual machine's deduplication metadata files (processing block 304). The copy is generated using the deduplication metadata for the virtual machine. Use of the deduplication metadata enables processing logic to make rapid copies of the virtual machine, rather than requiring a block-by-block based copying of an entire virtual machine and associated data files.

Processing logic utilizes the copied deduplication metadata files to open the copy of the virtual machine (processing block 306). The deduplication metadata for the file contents of the copy of the virtual machine are then converted from the initial hypervisor format to be compatible with a target hypervisor format of a destination deduplication system, and the deduplication metadata for the converted virtual machine is updated (processing block 308).

After the conversion has been completed, the deduplication metadata for the converted virtual machine(s) are then provided to the destination deduplication system(s) (processing block 310). In one embodiment, the converted virtual machine is transferred to a system with the target hypervisor format type by transferring the converted virtual machine's deduplication metadata, as described in U.S. patent application Ser. No. 13/765,687, filed Feb. 12, 2013, entitled "METHOD AND APPARATUS FOR EFFICIENT PROVISIONING OF CLONED VIRTUAL MCHAINE IMAGES USING DEDUPLICATION METADTA," or U.S. patent application Ser. No. 14/177,899, filed Feb. 11, 2014, entitled "METHOD AND APPARATUS FOR REPLICATION OF FILES AND FILE SYSTEMS USING A DEDUPLICATION KEY SPACE," which are incorporated herein in their entirety.

In one embodiment, the conversion process described in FIG. 3 may alternatively copy the virtual machine at a source deduplication system, and transfer the copy, or deduplication metadata for the copy, to a destination deduplication system prior to hypervisor format conversion. In this embodiment, the destination deduplication system would complete the conversion process by opening and applying conversion tools to the contents of the deduplication metadata for the virtual machine's files in order to complete the conversion from the initial hypervisor format to the target hypervisor format. The application of the embodiments discussed above in FIG. 3 may be selected by a user, be based on resources balancing at source and destination deduplication systems, etc.

Figure 4:
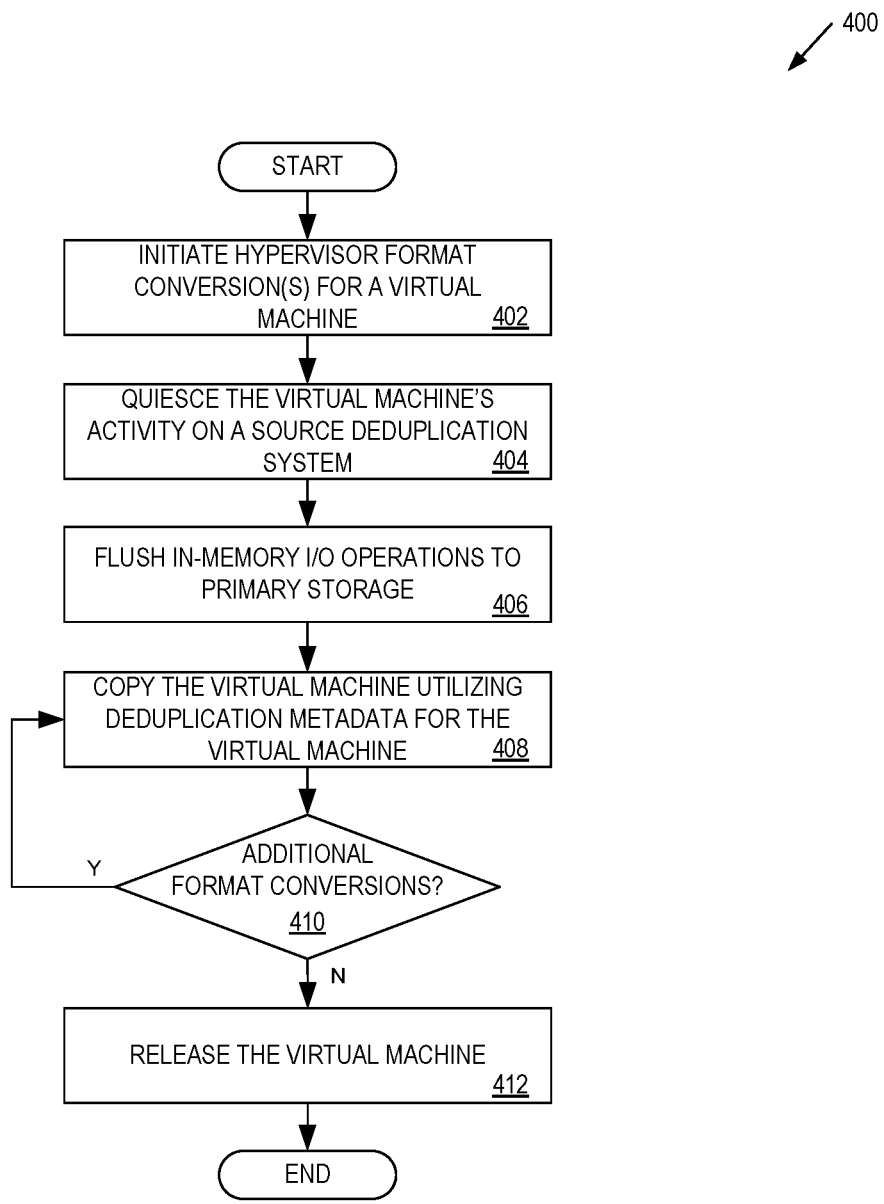
FIG. 4 is a flow diagram of one embodiment of a method for the rapid replication of a virtual machine to be converted between hypervisor formats.

FIG. 4 is a flow diagram of one embodiment of a method 400 for the rapid replication of a virtual machine to be converted between hypervisor formats. The method 400 is performed by processing logic that may comprise hardware (circuitry, dedicated logic, etc.), software (run on a general purpose computer system or a dedicated machine), firmware, or a combination. In one embodiment, the method 300 is performed by VM format converter, such as VM format converter 180 and 280, described above with respect to FIG. 1 and FIG. 2.

Referring to FIG. 4, the process begins by initiating a hypervisor format conversion for a virtual machine (processing block 402). As discussed above, the initiation can be based on user requests, or automatically based on configurable parameters.

The virtual machine's activity is quiesced on a source deduplication system (processing block 404). Furthermore, in-memory input/output operations are flushed to primary storage of the source deduplication system (processing block 406). In one embodiment, quiescing the activity on the source deduplication system may include pausing running processes of the virtual machine on the source deduplication system, without shutting down the virtual machine. That is, activities that may potentially modify a virtual machine's files and/or deduplication metadata are pause to ensure consistency of the virtual machine's deduplication metadata during the copy process, as discussed herein. Furthermore, all existing in-flight input/output operations to the files representing the virtual machine's files, which currently reside in memory, are flushed to a hardware storage device to ensure the integrity of the of the virtual machine's deduplication metadata.

The virtual machine is then copied utilizing deduplication metadata for the virtual machine (processing block 408). Processing logic utilizes deduplication metadata when making the copy of the virtual machine to enable the rapid and real-time, or near real-time, copying of an entire virtual machine including the virtual machine's disk files, hypervisor configuration files, and any additional files associated with the virtual machine. In one embodiment, the copy operations performed by processing logic only copies certain data which represents the minimal deduplication file system metadata, which is specific to the files belonging to the virtual machine being copied. In other words, a block level copy of all possible blocks belong to the virtual machine need not be performed.

Processing logic determines if there are additional conversions to be performed (processing block 410). That is, processing logic makes a copy of the virtual machine deduplication metadata for each conversion to be performed. When there are additional copies of the virtual machine to be made, processing logic returns to processing block 408. After all VM copies have been made for each hypervisor format conversion that is to occur, processing logic releases the virtual machine for execution by the deduplication file system (processing block 412). In another embodiment, processing logic may copy the copied virtual machine's metadata for each additional needed copy. In this embodiment, processing logic would proceed to processing block 412 to release the virtual machine after the first copy is completed.

As discussed above, the virtual machine's deduplication metadata is utilized by processing logic to make copies of the virtual machine, rather than copying the virtual machine itself on a block-by-block basis. Use of the virtual machine metadata enables rapid (i.e., real-time or near real-time) copies to be made of a virtual machine. Thus, the time taken to quiesce the virtual machine, flush the memory, complete the deduplication metadata-based copy, and release the quiesced virtual machine ensures that there is minimal, if any, delay experienced by an end user of the virtual machine. Furthermore, the conversion of a virtual machine from an initial hypervisor format to one or more target hypervisor formats are performed on the copied virtual machines. By performing the conversion operations, as discussed below, on the copies of the initial virtual machine deduplication metadata, the initial virtual machine is minimally disturbed so that user interaction with the virtual machine may continue during the conversion process.

Figure 5:
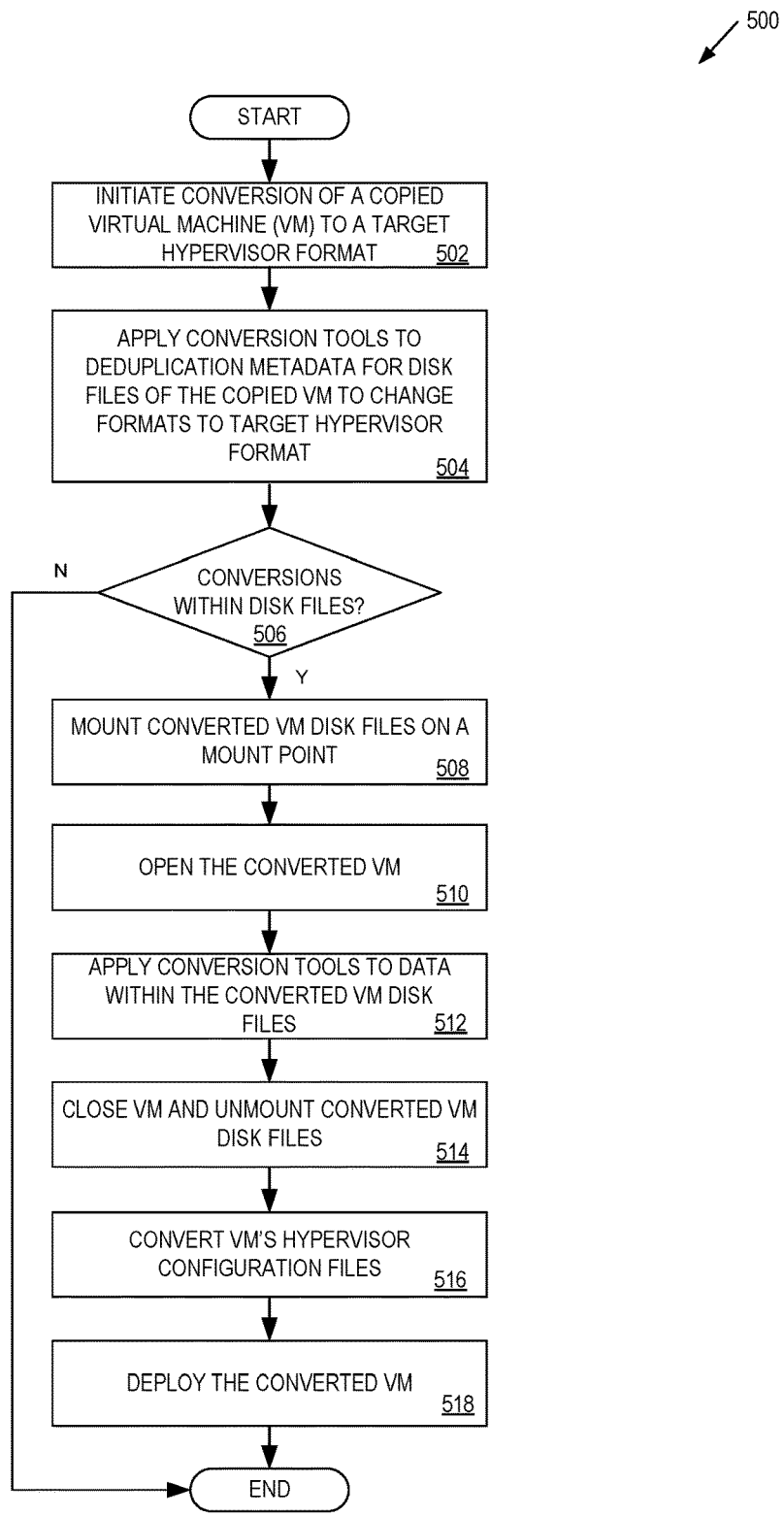
FIG. 5 is a flow diagram of one embodiment of a method for performing one or more conversion operations on virtual machine deduplication metadata.

FIG. 5 is a flow diagram of one embodiment of a method 500 for performing one or more conversion operations on virtual machine deduplication metadata. The method 500 is performed by processing logic that may comprise hardware (circuitry, dedicated logic, etc.), software (run on a general purpose computer system or a dedicated machine), firmware, or a combination. In one embodiment, the method 300 is performed by VM format converter, such as VM format converter 180 and 280, described above with respect to FIG. 1 and FIG. 2.

Referring to FIG. 5, the processing begins by initiating conversion of a copied virtual machine to a target hypervisor format (processing block 502). In one embodiment, where there are multiple conversions to be performed, processing logic performs blocks 502-514 for each conversion.

One or more conversion tools are applied to deduplication metadata for disk files of the copied VM to change formats of the disk files to a target hypervisor format (processing block 504). In one embodiment, the conversion tools are applied to the deduplication metadata on an as-needed basis when a source hypervisor format and a target hypervisor format are different and/or incompatible with each other.

Processing logic then determines whether any conversion operations are needed within the disk files (processing block 506). That is, the operations performed in processing block 504 are conversion operations that can be performed on static deduplication metadata for the virtual machine. Some conversion operations, however, require a VM image to be mounted and opened in order to access runtime, or other dynamically generated data, which may require conversion to a target hypervisor format type.

When there are no conversion operations needed within the disk files, the process ends. However, when there are conversions operations needed within the disk files (processing block 506), processing logic utilizes the copied deduplication metadata to mount the converted VM disk files on a mount point (processing block 508). In one embodiment, the VM disk files are mounted as a regular block device on a mountpoint, using appropriate tools. The converted VM may then be opened (processing block 510). In one embodiment, opening the VM includes utilizing the deduplication metadata to execute or run the VM. Conversion tools are applied to deduplication metadata for data within the converted VM disk files (processing block 512). The application of the conversion tools ensure the proper and correction functionality of the converted VM under control of the target hypervisor.

After the conversion tools have been applied, the converted VM is closed and unmounted (processing block 514). The deduplication metadata for the VM's hypervisor configuration files are then converted to the appropriate target hypervisor formats and configurations (processing block 516). At the completion of processing block 516, the VM has been fully converted to the target hypervisor type by application of the various conversion tools to deduplication metadata. That is, the converted deduplication metadata ensures that the converted VM will operate and function properly under the management of the target hypervisor type in a destination deduplication file system.

Processing logic may then deploy the converted virtual machine (processing block 518). In one embodiment, deployment of the converted virtual machine can involve archiving of the deduplication metadata for the virtual machine, either at a local deduplication system and/or at one or more remote deduplication systems. In another embodiment, deployment of the converted virtual machine can involve migration or transportation of the deduplication metadata for the converted virtual machine to a target hypervisor at a local and/or remote deduplication system, and made available for execution on the target hypervisor.

Furthermore, migration or transportation of the converted virtual machine's deduplication metadata can be made to a plurality of remote deduplication systems. In one embodiment, the migration or transportation of the converted virtual machine's deduplication metadata may occur in parallel so that the same virtual machine is distributed to several different deduplication systems. The converted virtual machine can then be made available at the multiple different deduplication systems for archival and/or retrieval purposes, such as to ensure high availability of the converted virtual machine, to provide disaster recovery backups of the converted virtual machine, and for immediate execution of the virtual machine at the deduplication systems.

Figure 6:
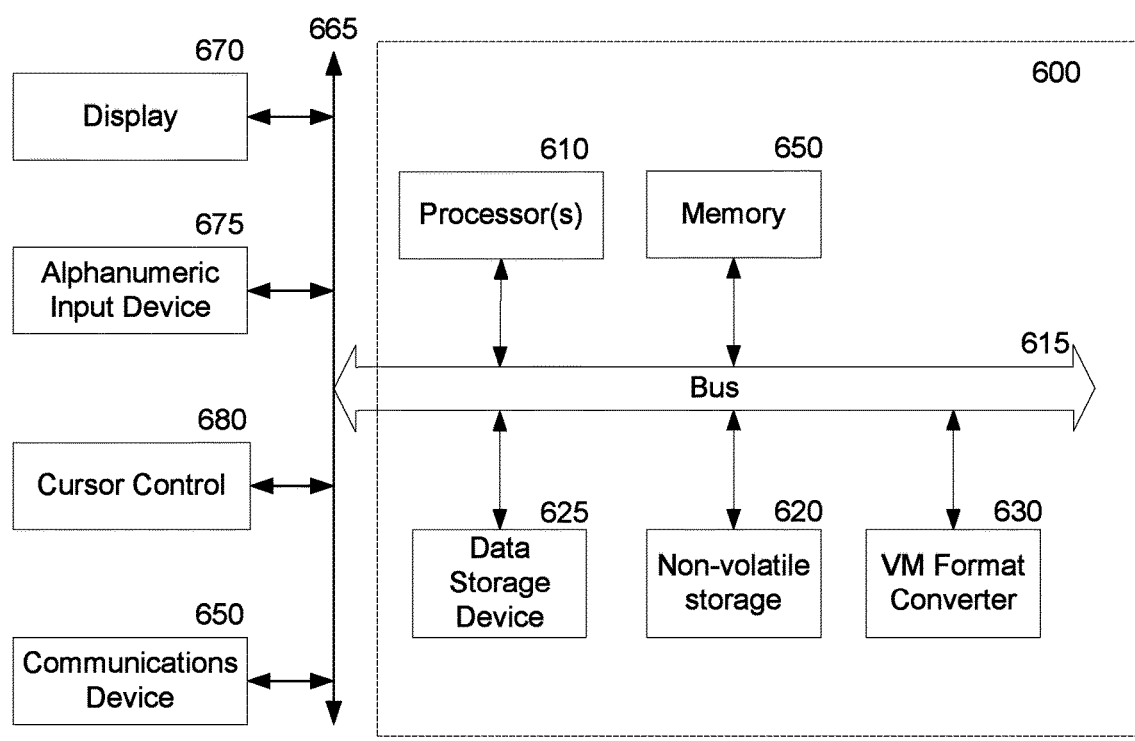
FIG. 6 illustrates an example schematic drawing of a computer network infrastructure.

FIG. 6 is one embodiment of a computer system that may be used with the present invention. It will be apparent to those of ordinary skill in the art, however that other alternative systems of various system architectures may also be used.

The data processing system illustrated in FIG. 6 includes a bus or other internal communication means 615 for communicating information, and one or more processor(s) 610 coupled to the bus 615 for processing information. The system further comprises a random access memory (RAM) or other volatile storage device 650 (referred to as memory), coupled to bus 615 for storing information and instructions to be executed by one or more processor(s) 610. Main memory 650 also may be used for storing temporary variables or other intermediate information during execution of instructions by processor 610. The system also comprises a read only memory (ROM) and/or static storage device 620 coupled to bus 615 for storing static information and instructions for processor(s) 610, and a data storage device 625 such as a magnetic disk or optical disk and its corresponding disk drive. Data storage device 625 is coupled to bus 615 for storing information and instructions, and may also be referred to herein as memory. One or more of the memories of the computer system may store one or more processing modules including VM format converter 630 to implement embodiments described herein. It should be appreciated that embodiments of the invention as described herein may be implemented through the execution of instructions, for example as stored in the storage 620, data storage device 625, or other element, by processor(s) 610 of the computer system.

The system may further be coupled to a display device 670, such as a cathode ray tube (CRT) or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 670 for accessing other nodes of a distributed system via a network. The communication device 670 may include any of a number of commercially available networking peripheral devices such as those used for coupling to an Ethernet, token ring, Internet, or wide area network. The communication device 670 may further be a null-modem connection, or any other mechanism that provides connectivity between the computer system 600 and the outside world. Note that any or all of the components of this system illustrated in FIG. 6 and associated hardware may be used in various embodiments of the present invention.

It will be appreciated by those of ordinary skill in the art that any configuration of the system may be used for various purposes according to the particular implementation. The control logic or software implementing the present invention can be stored in main memory 650, mass storage device 625, or other storage medium locally or remotely accessible to processor(s) 610.

It will be apparent to those of ordinary skill in the art that the system, method, and process described herein can be implemented as software stored in main memory 650 or read only memory 620 and executed by processor(s) 610. This control logic or software may also be resident on an article of manufacture comprising a computer readable medium having computer readable program code embodied therein and being readable by the mass storage device 625 and for causing the processor 610 to operate in accordance with the methods and teachings herein.

The present invention may also be embodied in a handheld or portable device containing a subset of the computer hardware components described above. For example, the handheld device may be configured to contain only the bus 615, the processor(s) 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

In the preceding description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "initiating", "generating", "opening", "converting", "performing", "quiescing", "flushing", "releasing", "providing", "transferring", "archiving", or the like, refer to the actions and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The processes and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A computer-implemented method comprising:
   in response to initiation of conversion of a virtual machine, quiescing activities of the virtual machine at a source deduplication system;
   flushing in-memory input-output operations of the virtual machine to a primary storage of the source deduplication system;
   generating a copy of the virtual machine by replication of deduplication metadata for one or more files corresponding to the virtual machine;
   opening the copy of the virtual machine from the replicated deduplication metadata;
   converting the replicated deduplication metadata from an initial hypervisor format to a target hypervisor format to generate a converted virtual machine; and
   releasing the virtual machine after the replication of the deduplication metadata has been generated.

2. A computer-implemented method comprising:
   generating a copy of the virtual machine by replication of deduplication metadata for one or more files corresponding to the virtual machine;
   opening the copy of the virtual machine from the replicated deduplication metadata; and
   converting the replicated deduplication metadata from an initial hypervisor format to a target hypervisor format to generate a converted virtual machine, wherein the one or more files corresponding to the virtual machine comprise at least virtual machine image files and hypervisor configuration files, further comprising:
   performing one or more conversion operations to deduplication metadata corresponding to one or more of the virtual machine image files and hypervisor configuration files to update a formatting of the one or more of the virtual machine image files and hypervisor configuration files to the target hypervisor format,
   in response to a determination that the virtual machine contains dynamic content, opening the copy of the virtual machine, and
   performing one or more conversion operations on deduplication metadata within the virtual machine image files and hypervisor configuration files of the opened copy of the virtual machine.

3. The method of claim 1, wherein generating the copy of the virtual machine comprises generating a plurality of copies of the deduplication metadata, wherein a first copy of the deduplication metadata is to be converted to a first target hypervisor format and a second copy of the deduplication metadata is to be converted to a second different target hypervisor format.

4. The method of claim 1, further comprising:
   providing deduplication metadata corresponding to the converted virtual machine to a destination deduplication systems having the target hypervisor format.

5. The method of claim 4, wherein the destination deduplication systems is a remote deduplication system at a physical location different from the source deduplication system, and providing the deduplication metadata further comprises:
   transferring the deduplication metadata corresponding to the converted virtual machine from the source deduplication system to the destination deduplication system.

6. The method of claim 4, wherein a source deduplication system and the destination deduplication systems are at a single computer processing system.

7. The method of claim 1, wherein the conversion of the virtual machine is initiated in response to receipt of a user command to perform the conversion, and wherein the user command specifies at least the virtual machine to be converted, the target hypervisor type, and a destination deduplication system to receive a converted copy of the virtual machine.

8. The method of claim 1, wherein the conversion of the virtual machine is initiated automatically in response to detection of one or more configurable parameters, wherein the configurable parameters comprise one or more of a periodic time interval, exceeding a resource usage limit at the source deduplication system, a lack of suitability of the virtual machine to perform a given task, and failing to satisfy one or more virtual machine availability requirements.

9. The method of claim 1, further comprising:
   archiving the deduplication metadata corresponding to the converted virtual machine.

10. A non-transitory computer readable storage medium including instructions that, when executed by a processor, cause the processor to perform a method comprising:
    in response to initiation of conversion of a virtual machine, quiescing activities of the virtual machine at a source deduplication system;

flushing in-memory input-output operations of the virtual machine to a primary storage of the source deduplication system;
generating a copy of the virtual machine by replication of deduplication metadata for one or more files corresponding to the virtual machine;
opening the copy of the virtual machine from the replicated deduplication metadata;
converting the replicated deduplication metadata from an initial hypervisor format to a target hypervisor format to generate a converted virtual machine; and
releasing the virtual machine after the replication of the deduplication metadata has been generated.

11. The non-transitory computer readable storage medium of claim 10, wherein generating the copy of the virtual machine comprises generating a plurality of copies of the deduplication metadata, wherein a first copy of the deduplication metadata is to be converted to a first target hypervisor format and a second copy of the deduplication metadata is to be converted to a second different target hypervisor format.

12. The non-transitory computer readable storage medium of claim 10, further comprising:
providing deduplication metadata corresponding to the converted virtual machine to a destination deduplication systems having the target hypervisor format.

13. A non-transitory computer readable storage medium including instructions that, when executed by a processor, cause the processor to perform a method, comprising:
generating a copy of the virtual machine by replication of deduplication metadata for one or more files corresponding to the virtual machine;
opening the copy of the virtual machine from the replicated deduplication metadata; and
converting the replicated deduplication metadata from an initial hypervisor format to a target hypervisor format to generate a converted virtual machine, wherein the one or more files corresponding to the virtual machine comprise at least virtual machine image files and hypervisor configuration files, further comprising:
performing one or more conversion operations to deduplication metadata corresponding to one or more of the virtual machine image files and hypervisor configuration files to update a formatting of the one or more of the virtual machine image files and hypervisor configuration files to the target hypervisor format,
in response to a determination that the virtual machine contains dynamic content, opening the copy of the virtual machine, and
performing one or more conversion operations on deduplication metadata within the virtual machine image files and hypervisor configuration files of the opened copy of the virtual machine.

14. A system, comprising:
a memory to store deduplication metadata for a virtual machine; and
a processor coupled with the memory to execute a virtual machine format converter to
in response to initiation of conversion of a virtual machine, quiesce activities of the virtual machine at a source deduplication system,
flush in-memory input-output operations of the virtual machine to a primary storage of the source deduplication system,
generate a copy of a virtual machine by replication of deduplication metadata for one or more files corresponding to the virtual machine,
open the copy of the virtual machine from the replicated deduplication metadata,
convert the replicated deduplication metadata from an initial hypervisor format to a target hypervisor format to generate a converted virtual machine, and
release the virtual machine after the replication of the deduplication metadata has been generated.

15. The system of claim 14, wherein generating the copy of the virtual machine comprises generating a plurality of copies of the virtual machine, wherein generating the copy of the virtual machine comprises generating a plurality of copies of the deduplication metadata, wherein a first copy of the deduplication metadata is to be converted to a first target hypervisor format and a second copy of the deduplication metadata is to be converted to a second different target hypervisor format.

16. The system of claim 14, further comprising the processor to execute the virtual machine format converter to
provide deduplication metadata corresponding to the converted virtual machine to a destination deduplication systems having the target hypervisor format.

17. A system, comprising:
a memory to store deduplication metadata for a virtual machine; and
a processor coupled with the memory to execute a virtual machine format converter to
generate a copy of the virtual machine by replication of deduplication metadata for one or more files corresponding to the virtual machine,
open the copy of the virtual machine from the replicated deduplication metadata, and
convert the replicated deduplication metadata from an initial hypervisor format to a target hypervisor format to generate a converted virtual machine, wherein the one or more files corresponding to the virtual machine comprise at least virtual machine image files and hypervisor configuration files, further comprising the processor to execute the virtual machine format converter to:
perform one or more conversion operations to deduplication metadata corresponding to one or more of the virtual machine image files and hypervisor configuration files to update a formatting of the one or more of the virtual machine image files and hypervisor configuration files to the target hypervisor format, and
in response to a determination that the virtual machine contains dynamic content, open the copy of the virtual machine, and
perform one or more conversion operations on deduplication metadata within the virtual machine image files and hypervisor configuration files of the opened copy of the virtual machine.

* * * * *